(12) United States Patent
Saigo et al.

(10) Patent No.: US 9,204,141 B2
(45) Date of Patent: Dec. 1, 2015

(54) EYEWEAR DEVICE AND METHOD FOR CONTROLLING EYEWEAR DEVICE

(75) Inventors: Katsuo Saigo, Hyogo (JP); Kazuhiro Mihara, Osaka (JP); Masashi Imai, Osaka (JP); Norikazu Kaneshiro, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 201 days.

(21) Appl. No.: 13/609,960

(22) Filed: Sep. 11, 2012

(65) Prior Publication Data

US 2013/0063557 A1   Mar. 14, 2013

Related U.S. Application Data

(63) Continuation of application No. PCT/JP2011/006735, filed on Dec. 1, 2011.

(60) Provisional application No. 61/422,416, filed on Dec. 13, 2010.

(30) Foreign Application Priority Data

Dec. 28, 2010   (JP) .................................. 2010-293685

(51) Int. Cl.
*H04N 13/00*   (2006.01)
*H04N 13/04*   (2006.01)

(52) U.S. Cl.
CPC ....... *H04N 13/0497* (2013.01); *H04N 13/0438* (2013.01); *H04N 2213/008* (2013.01)

(58) Field of Classification Search
CPC ........... H04N 13/0438; H04N 13/0497; G02B 27/2264

USPC ......................................................... 348/42
See application file for complete search history.

(56) References Cited

U.S. PATENT DOCUMENTS 4,967,268 A   10/1990   Lipton et al.
6,456,432 B1   9/2002   Lazzaro et al.
(Continued)

FOREIGN PATENT DOCUMENTS

CN   201360319   12/2009
EP   2 373 047   10/2011
(Continued)

OTHER PUBLICATIONS

International Search Report issued Jan. 17, 2012 in International (PCT) Application No. PCT/JP2011/006735.
(Continued)

*Primary Examiner* — Jay Patel
*Assistant Examiner* — Neil Mikeska
(74) *Attorney, Agent, or Firm* — Wenderoth, Lind & Ponack, L.L.P.

(57) ABSTRACT

An eyewear device which adjusts a transmitted light amount to a left eye and a right eye of a viewer to perform an assistance operation, which assists the viewer in viewing images so that the viewer stereoscopically perceives the images, comprising: a receiver configured to receive a synchronization signal in synchronization with display of the images; and a controller which analyzes a signal configuration of the synchronization signal after power supply is started for the assistance operation, and switches a control mode between a first control mode and a second control mode, which is different from the first control mode, based on an analysis result of the signal configuration.

11 Claims, 10 Drawing Sheets

(56) References Cited

U.S. PATENT DOCUMENTS

| | | | |
|---|---|---|---|
| 2006/0256287 A1* | 11/2006 | Jacobs | 352/85 |
| 2010/0085424 A1* | 4/2010 | Kane et al. | 348/53 |
| 2010/0157027 A1* | 6/2010 | MacNaughton et al. | 348/53 |
| 2010/0194857 A1 | 8/2010 | Mentz et al. | |
| 2010/0259603 A1 | 10/2010 | Mihara et al. | |
| 2010/0295929 A1 | 11/2010 | Yoshifuji et al. | |
| 2010/0315316 A1* | 12/2010 | Mihara et al. | 345/32 |
| 2011/0227909 A1 | 9/2011 | Hayes et al. | |
| 2011/0228046 A1* | 9/2011 | Arling et al. | 348/42 |
| 2011/0234777 A1* | 9/2011 | Kobayashi et al. | 348/56 |
| 2011/0249103 A1 | 10/2011 | Taniguchi | |
| 2011/0254936 A1* | 10/2011 | MacNaughton et al. | 348/56 |
| 2012/0019638 A1* | 1/2012 | MacNaughton et al. | 348/56 |
| 2012/0033059 A1 | 2/2012 | Mihara et al. | |
| 2013/0286163 A1* | 10/2013 | Dror et al. | 348/47 |

FOREIGN PATENT DOCUMENTS

| | | |
|---|---|---|
| JP | 8-278468 | 10/1996 |
| JP | 11-98538 | 4/1999 |
| JP | 11-98540 | 4/1999 |
| JP | 2000-36969 | 2/2000 |
| JP | 2009-230071 | 10/2009 |
| JP | 2010-62767 | 3/2010 |
| JP | 2010-266840 | 11/2010 |
| JP | 2010-273259 | 12/2010 |
| JP | 2011-223187 | 11/2011 |
| WO | 2011/115736 | 9/2011 |

OTHER PUBLICATIONS

Supplementary European Search Report issued May 4, 2015 in European Application No. 11849638.9.

"Xpand Universal 3D glasses (X103) Quick-Install user guide", Nov. 5, 2010, pp. 1-2.

Veritas at Visus: "LCD TV Matters—A Great TV in Every Room", vol. 3, No. 3, Jun. 1, 2010, pp. 1-68.

Supplementary European Search Report issued May 4, 2014 in European Application No. 11849638.9.

Office Action issued Dec. 25, 2014 in corresponding Chinese Application No. 201180014800.3, with partial English translation.

* cited by examiner

EYEWEAR DEVICE AND METHOD FOR CONTROLLING EYEWEAR DEVICE

This application is a Continuation of International Application No. PCT/JP2011/006735, with the International Filing Date of Dec. 1, 2011, which claims the benefit of U.S. Provisional Application No. 61/422,416, filed Dec. 13, 2010.

TECHNICAL FIELD

The present invention relates to an eyewear device to assist in viewing a stereoscopic image so that a left-eye image, which is viewed by the left eye, and a right-eye image, which is viewed by the right eye, and a method for controlling the eyewear device.

BACKGROUND OF THE INVENTION

As 3D movies become popular, display devices to watch 3D images at home have been developed and launched in the market. The 3D image display device typically uses the frame sequential scheme (also called "time-divisional scheme") which alternately switches and displays a left-eye image, which is viewed by the left eye, and a right-eye image, which is viewed by the right eye.

A projector used in a movie theatre, a TV device used at home or a display device of a personal computer is exemplified as the display device using the frame sequential scheme or the time-division scheme. These 3D display devices alternatively switch and display the left-eye image and the right-eye image. The viewer watches the displayed images on the 3D display device through an eyewear device (generally called "3D active shutter eyewear").

The display device transmits synchronization signals in synchronization with the display of the left-eye and/or right-eye images. For example, infrared (IR) signals or radio (RF) signals are used as the synchronization signals. In synchronization with the display of the left-eye image, the eyewear device, which receives the synchronization signal, opens the left shutter situated in front of the left eye, and closes the right eye shutter situated in front of the right eye. In synchronization with the display of the right-eye image, the eyewear device also opens the right shutter and closes the left shutter. Thus, the light from the left-eye image transmits only to the left eye, and the light from the right-eye image transmits only to the right eye.

Liquid crystal shutters are typically used as the left and right shutters of the eyewear device. The left and right liquid crystal shutters open and close in response to the received synchronization signal. The synchronization signals transmitted from the display device are used to notify the eyewear device of timings to open or close the left and right liquid crystal shutters in synchronization with the display of the left-eye or right-eye image (e.g. see Patent Document 1 or 2).

An eyewear device, hereafter "theatre eyewear device", which is used in a movie theatre that shows 3D movies, and another eyewear device, hereafter "domestic eyewear device", which is used for a domestic TV device or a display device for a domestic personal computer that displays 3D images (hereafter called "3D display devices"), are manufactured on the basis of different specifications, respectively. Therefore, a user may use a single eyewear device to view only the 3D movie shown in the movie theatre or the 3D image displayed on the home 3-D display device.

When a domestic eyewear device is purchased, a user may actually try on various eyewear devices to select an eyewear device which fits best. On the other hand, a theatre eyewear device is not always perfectly fit a user, who actually wears it, although the theatre eyewear device is designed to fit many individuals. If images are viewed at the theatre by the user wearing the imperfectly fit eyewear device, the user may insufficiently concentrate on the images shown in the theatre.

If the user uses own eyewear device in a theatre, the user may comfortably view the images, but as described above, there is no common or unified specifications about the synchronization signals at this moment. The theatre 3D display device and the home 3D display device transmit synchronization signals in conformity with different specifications from each other (different codes, different transmission timings) of the eyewear devices, respectively. Eyewear devices are also inherently programmed so that the shutters are opened and closed according to the specifications of the transmitted synchronization signals.

In terms of maintaining image quality, which is provided to viewers, and compatibility with conventional apparatuses, it is undesirable to change the codes and timings of the synchronization signals, which are optimized for conventional 3D display devices and corresponding eyewear devices. Therefore, it is difficult under the current situation to change the specifications of the synchronization signals which are inherently used in theatres and in houses, respectively.

Patent Document 1: JP 11-98538 A
Patent Document 2: JP 2000-36969 A

DISCLOSURE OF THE INVENTION

It is an object of the present invention to provide an eyewear device which appropriately operates in response to synchronization signals in conformity with different specifications, and a method for appropriately controlling the eyewear device in response to the synchronization signals in conformity with different specifications.

An eyewear device according to one aspect of the present invention adjusts a transmitted light amount to a left eye and a right eye of a viewer to perform an assistance operation that assists the viewer in viewing images so that the viewer stereoscopically perceives the images. The eyewear device includes: a receiver configured to receive a synchronization signal in synchronization with display of the images; and a controller which analyzes a signal configuration of the synchronization signal after power supply is started for the assistance operation, and switches a control mode between a first control mode and a second control mode, which is different from the first control mode, based on an analysis result of the signal configuration.

A method according to another aspect of the present invention is used for controlling an eyewear device, which adjusts a transmitted light amount to a left eye and a right eye of a viewer to perform an assistance operation that assists the viewer viewing images so that the viewer stereoscopically perceives the images. The method includes: steps of receiving a synchronization signal; analyzing a signal configuration of the synchronization signal; and switching a control mode for the eyewear device between a first control mode and a second control mode, which is different from the first control mode, based on an analysis result of the signal configuration.

The present invention may provide an eyewear device which appropriately operates in response to synchronization signals in conformity to different specifications, and a method for appropriately controlling the eyewear device in response to the synchronization signals in conformity with different specifications.

These and other objects, features and advantages of the present invention will become more apparent upon reading the following detailed description along with the accompanying drawings.

DETAILED DESCRIPTION OF THE INVENTION

Figure 1:
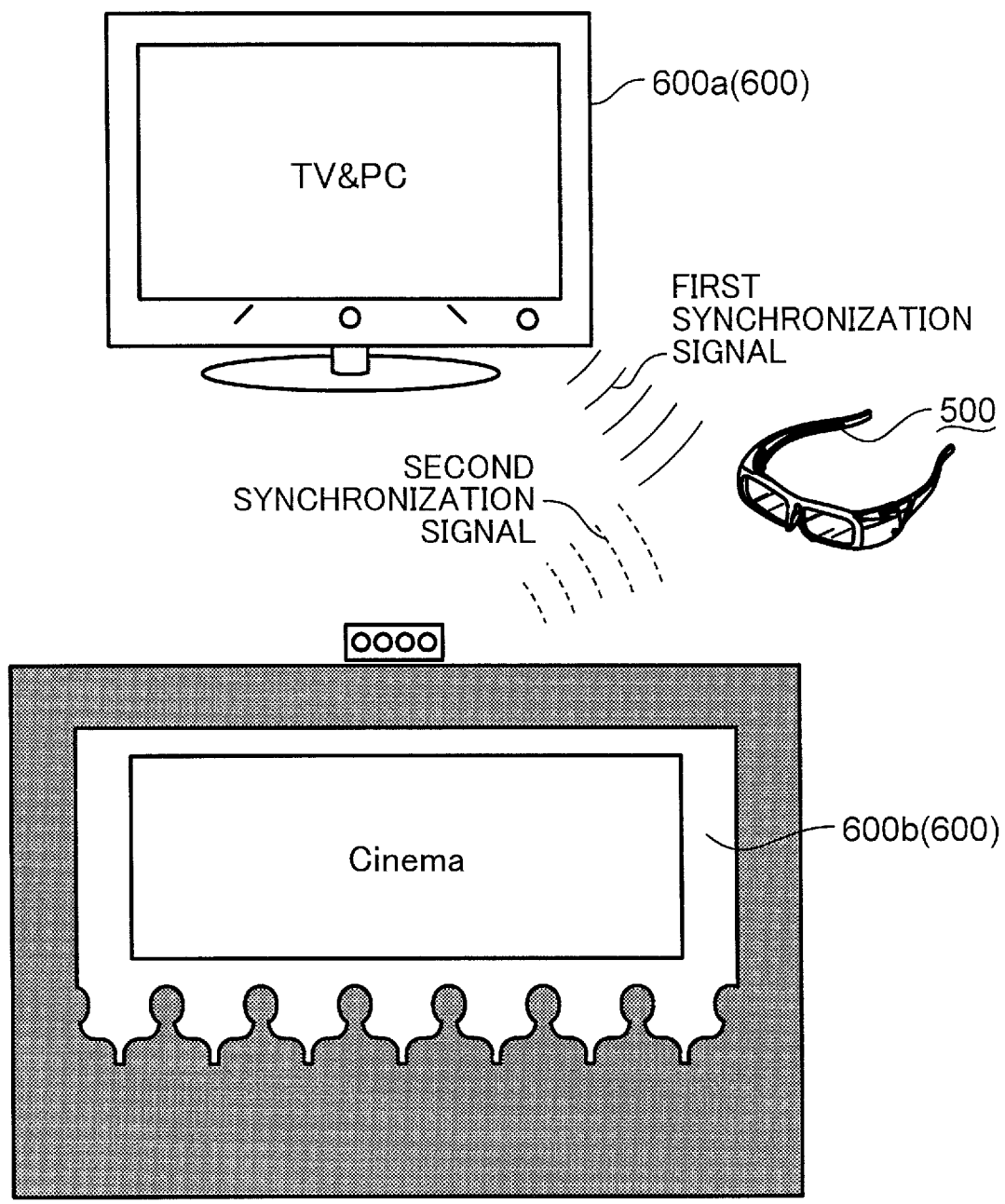
FIG. 1 is a schematic view showing an operation environment of an eyewear device according to one embodiment.

An eyewear device and a method for controlling the eyewear device according to one embodiment are described with reference to the accompanying drawings. Configuration, arrangement, shapes shown in the drawings and description about the drawings are intended to make principles of the eyewear device and the method for controlling the eyewear device easily understood without limiting in any way the principle of the eyewear device and the method for controlling the eyewear device.

(Configuration of Eyewear Device)

FIG. 1 is a schematic view showing an environment in which the eyewear device is used. The operation environment of the eyewear device is described with reference to FIG. 1.

The eyewear device 500 is manufactured, for example, so that a viewer may watch both stereoscopic images displayed by a domestic display device 600a and by a theatre display device 600b. The domestic display device 600a transmits a first synchronization signal to the eyewear device 500. The theatre display device 600b transmits a second synchronization signal to the eyewear device 500. The eyewear device 500 executes an assistance operation to assist in viewing the stereoscopic images in response to the first or second synchronization signal, by the switching operation of the control modes described later.

A TV device or a display device of a personal computer is exemplified as the domestic display device 600a. Alternatively, another display device which displays a stereoscopic image under a relatively bright environment (e.g. under an environment of 50 lx or more, 200 lx or less) may be used as the display device which transmits the first synchronization signal.

A display system (e.g. projector) which displays a stereoscopic image in a movie theatre is exemplified as the theatre display device 600b. Alternatively, another display device which displays a stereoscopic image under a relatively dark environment and/or yet another display device that displays stereoscopic images viewed by many individuals may be used as the display device which transmits the second synchronization signal.

In the following description, the domestic display device 600a and the theatre display device 600b are generally called "display device 600". The display device 600 alternately displays a left-eye image (hereafter called "L image") created to be viewed by the left eye and a right-eye image (hereafter called "R image") created to be viewed by the right eye.

The display device 600a transmits the first synchronization signal to the eyewear device 500 in synchronization with display of the L and R images. The display device 600b transmits the second synchronization signal to the eyewear device 500 in synchronization with display of the L and R images.

In the following description, the first and second synchronization signals are generally called "synchronization signals". In this embodiment, infrared (IR) signals are used as the synchronization signals. Alternatively, radio (RF) signals or other signals capable of establishing communication between the display device 600 and the eyewear device 500 may be used as the synchronization signals.

The first and second synchronization signals have different protocols from each other. The term "protocol" used in the description of the present embodiment refers to a predetermined signal configuration between a transmission device which transmits synchronization signals and a reception device which receives the synchronization signals. In this embodiment, the transmission device corresponds to the display device 600. The reception device corresponds to the eyewear device 500.

A transmission wavelength band of a synchronization signal, transmission radio frequency, frequency of a synchronization signal, information volume of a synchronization signal, bit stream of a synchronization signal, and presence of an encrypted signal added to a synchronization signal are exemplified as the protocol. On the basis of the protocol difference between the first and second synchronization signals, the eyewear device 500 executes different operations.

Figure 2:
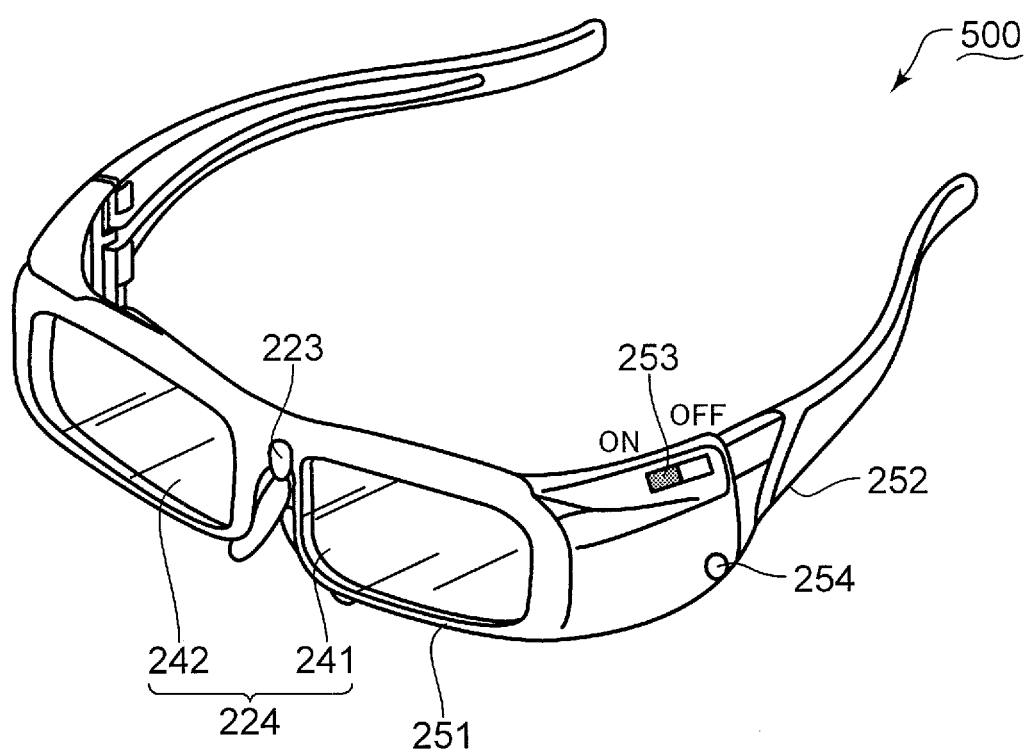
FIG. 2 is a schematic perspective view showing the eyewear device depicted in FIG. 1.

FIG. 2 is a schematic perspective view showing the eyewear device 500. The eyewear device 500 is described with reference to FIGS. 1 and 2.

The eyewear device 500 generally looks like eyewear for sight correction. The eyewear device 500 comprises an optical filter portion 224. The optical filter portion 224 includes an L optical filter 241, which is situated in front of the left eye of the viewer, and an R optical filter 242, which is situated in front of the right eye of the viewer wearing the eyewear device 500. The eyewear device 500 uses the L optical filter 241 to adjust an image light amount, which is transmitted to the left eye. The eyewear device 500 uses the R optical filter 242 to adjust an image light amount, which is transmitted to the right eye. The image light amount is adjusted in synchronization with display of the L and R images by the display device 600. The viewer perceives a parallax from the images viewed by the left and right eyes, and recognizes the images displayed by the display device 600 as a stereoscopic image. The light amount adjustment by the eyewear device 500 is hereafter called "assistance operation".

The eyewear device 500 has a light receiver 223 which is situated between the L and R optical filters 241, 242. The light receiver 223 receives the aforementioned synchronization signals. If RF signals are used as the synchronization signals, the eyewear device 500 may have a suitable element for receiving the RF signal, instead of the light receiver 223. In this embodiment, the light receiver 223 is exemplified as the receiver.

The eyewear device 500 includes a holder 251, which holds the optical filter portion 224 and the light receiver 223, and an arm 252, which extends from the holder 251 to the ears of the viewer. Various elements (described later) of the eyewear device 500 are stored in the holder 251 and the arm 252.

The eyewear device 500 further includes a slide type switch 253 mounted on the arm 252, and a removable battery (not shown) which is installed in the arm 252. The viewer may slide the switch 253 on the arm 252 to switch power supply from the battery ON/OFF to various elements of the eyewear device 500. The eyewear device 500 may execute the aforementioned assistance operation using the power from the battery. In this embodiment, the switch 253 and the battery are exemplified as the power supply portion.

The eyewear device 500 further includes an LED 254 mounted on the arm 252. The LED 254 may turn ON or OFF in response to reception of the synchronization signal. Optionally, the viewer may take off the eyewear device 500 to check whether the LED 254 is ON or OFF, so as to know a communication condition (e.g. reception condition of the first or second synchronization signal) between the eyewear device 500 and the display device 600. Since the LED 254 emits light outward, the viewer wearing the eyewear device 500 is less likely to recognize the emission of the LED 254. The LED 254 may turn ON or OFF if the switch 253 is operated to start the power supply to various elements of the eyewear device 500. In this embodiment, the LED 254 is exemplified as the notification portion.

Figure 3:
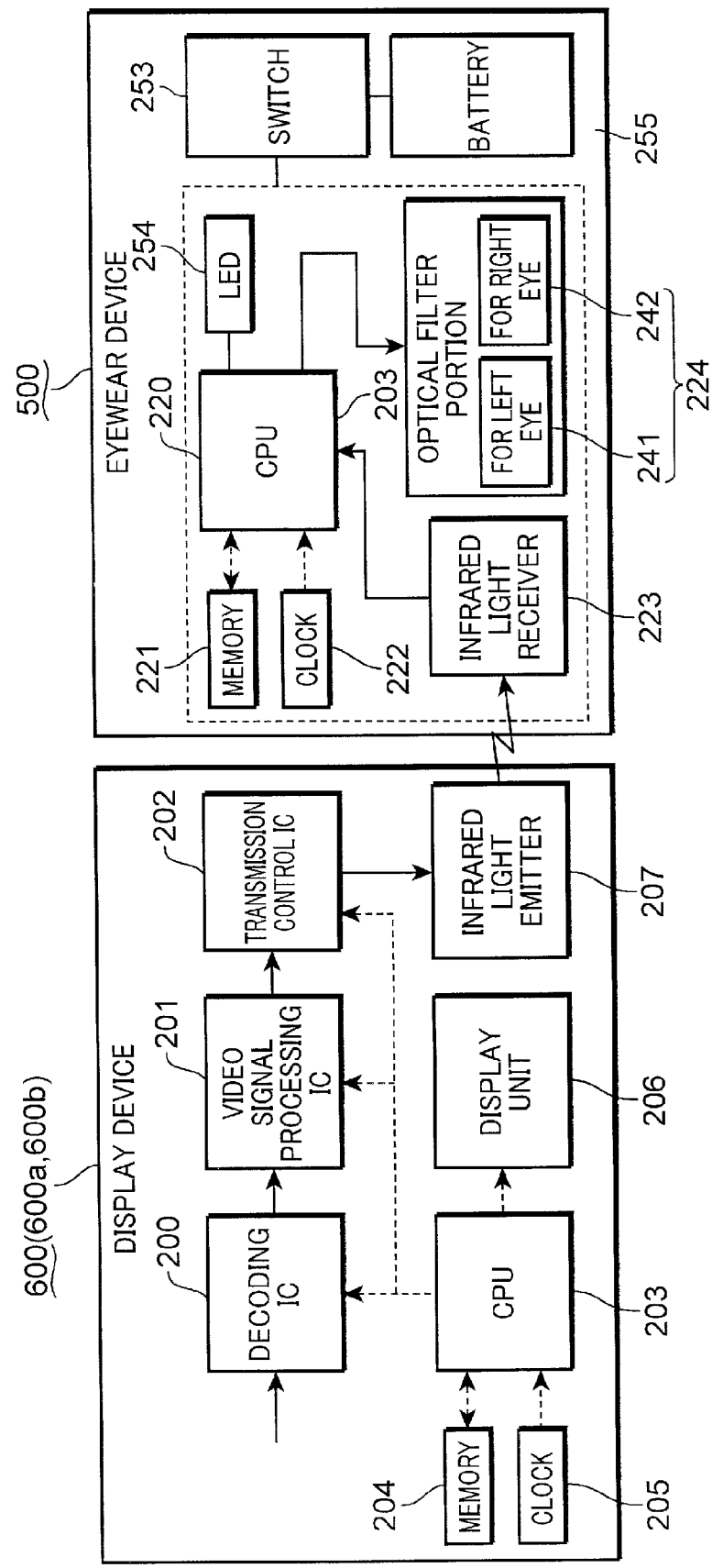
FIG. 3 is a block diagram showing a schematic hardware configuration of the eyewear device depicted in FIG. 1 and a display device.

FIG. 3 shows a hardware configuration of the display device 600 and the eyewear device 500. The hardware configuration of the display device 600 and the eyewear device 500 is described with reference to FIGS. 1 to 3.

The domestic display device 600a and the theatre display device 600b have a common hardware configuration, in order to avoid redundant explanations. However, the domestic display device 600a and the theatre display device 600b may have different hardware configurations because the hardware configuration of the display device 600 shown in FIG. 3 is exemplary.

The display device 600 has a decoding IC 200, a video signal processing IC 201, a transmission control IC 202, a CPU 203, a memory 204, a clock 205, a display unit 206 and a light emitter 207.

The decoding IC 200 decodes encoded input video signals, and then outputs the image data in a predetermined format. The MPEG (Motion Picture Experts Group)-2, MPEG-4 and H264 are exemplified as the image encoding methods.

The video signal processing IC 201 processes signals for the stereoscopic image display. The video signal processing IC 201 processes the video signal to display the image data from the decoding IC 200 as a stereoscopic image. Alternatively, the video signal processing IC 201 may detect L and R images from the image data decoded by the decoding IC 200 to alternately display the detected L and R images in sequence. Otherwise, the L and R images may be automatically generated from the image data, which are output by the decoding IC 200, and the video signal processing IC 201 may alternately output the generated left-eye image and right-eye image to the display unit 206. After the signal process about the stereoscopic image display, the video signal processing IC 201 generates output signals in conformity with the signal input scheme of the display unit 206.

The video signal processing IC 201 may execute other processes than the aforementioned processes. For example, the video signal processing IC 201 may execute processes to adjust perceived colors of the displayed image according to characteristics of the display unit 206. The video signal processing IC 201 may interpolate images between frames of the image data generated by the decoding IC 200 so as to increase an image frame rate.

The transmission control IC 202 generates synchronization signals in synchronization with the L and R images generated by the video signal processing IC 201, and outputs the generated synchronization signals to the light emitter 207.

The CPU 203 controls the entire display device 600. The CPU 203 controls various elements (e.g. decoding IC 200, video signal processing IC 201) of the display device 600, according to programs recorded in the memory 204 and external input (not shown).

The memory 204 is used for a domain to record programs, which the CPU 203 executes, and temporary data, which are generated under the execution of the programs. A volatile RAM (Random Access Memory) or non-volatile ROM (Read Only Memory) is exemplified as the memory 204.

The clock 205 supplies clock signals, which become operational references of each IC, to the CPU 203 and other components.

A video signal, which is output from the video signal processing IC 201, is displayed on the display unit 206 which is used for the domestic display device 600a. For example, a CRT scheme, an LCD using liquid crystal elements, a PDP or a display scheme using organic electro-luminescence is used for the display unit 206. A projector and a screen on which images are projected by the projector are exemplified as the display unit 206 used for the theatre display device 600b. The video signals, which are output from the video signal processing IC 201, are then output to the projector. The projector projects images, which are generated in response to the video signals, onto the screen.

The light emitter 207 outputs infrared light, which is used as the synchronization signal, under control of the transmission control IC 202. In this embodiment, the display device 600 outputs the synchronization signals from the light emitter 207 configured to emit the infrared light. Alternatively, the display device 600 may synchronize with the eyewear device 500 by means of radio signals or other signals.

The eyewear device 500 has a CPU 220, a memory 221, a clock 222, the light receiver 223, the optical filter portion 224, the LED 254, the switch 253 and a battery 255.

The CPU 220 controls the entire eyewear device 500 by means of the programs recorded in the memory 221 and external input signals (e.g. aforementioned synchronization signals). In this embodiment, the CPU 220 analyzes the protocol of a synchronization signal (first or second synchronization signal) after the power supply from the battery 255 is started. Based on the analysis result of the protocol, control for the eyewear device 500 is switched between a first control mode and a second control mode, which is different from the first control mode. It is described later how to switch the control modes.

The memory 221 is used as a domain for recording data of programs which the CPU 220 executes, and for storing temporary data while programs are executed. The memory 221 also stores in advance data about the protocol of the first and second synchronization signals. In this embodiment, the memory 221 is exemplified as the storage portion. The data about the protocol of the first and second synchronization signals is exemplified as the signal configuration data about the signal configuration of the first and second synchronization signals. The data about the protocol of the first and second synchronization signals may be, for example, data about the transmission wavelength band of a synchronization signal, the transmission radio frequency, the frequency of a synchronization signal, the information volume of a synchronization signal, the bit stream of a synchronization signal and/or presence of an encoded signal added to the synchronization signal.

The CPU 220 compares the protocol of the synchronization signal received by the light receiver 223 with the data about the protocol of the first and second synchronization signals. If the protocol of the synchronization signal received by the light receiver 223 matches with the protocol of the first synchronization signal stored in the memory 221, the CPU controls the eyewear device 500 in the first control mode. If the protocol of the synchronization signal received by the light receiver 223 matches with the protocol of the second synchronization signal stored in the memory 221, the CPU 220 controls the eyewear device 500 in the second control mode. In this embodiment, the CPU 220 is exemplified as the selector. The CPU 220 and the memory 221 are exemplified as the controller.

The clock 222 supplies clock signals, which are used as operational references to various elements (e.g. CPU 220) of the eyewear device 500. The clock signals may be divided or multiplied as appropriate.

The light receiver 223 receives the synchronization signals which the display device 600 transmits from the light emitter 207.

The optical filter portion 224 is situated in front of the left and right eyes of the viewer wearing the eyewear device 500, and executes the assistance operation to adjust the transmitted light amount to the left or right eye. The optical filter portion 224 appropriately performs the assistance operation for the left and right eyes under control of the CPU 220, so that the viewer wearing the eyewear device 500 stereoscopically perceives the images displayed by the display device 600.

If the CPU 220 selects the first control mode, the CPU 220 controls the optical filter portion 224 under the first control mode. The optical filter portion 224 controlled under the first control mode performs the assistance operation on the basis of the reception timing of the first synchronization signal. If the CPU 220 selects the second control mode, the CPU 220 controls the optical filter portion 224 under the second control mode. The optical filter portion 224 controlled under the second control mode performs the assistance operation on the basis of the reception timing of the second synchronization signal.

The power is supplied from the battery 255 to the CPU 220, the light receiver 223, the optical filter portion 224, the LED 254, the memory 221 and the clock 222.

The switch 253 switches START/STOP of the power supply from the battery 255 in response to the operation by the viewer, as described above.

The LED 254 turns ON or OFF to notify the viewer of the communication condition of the synchronization signals. The LED 254 is brightened or darkened under control of the CPU 220. If the CPU 220 selects the first control mode, the CPU 220 controls the LED 254 under the first control mode. If the CPU 220 selects the second control mode, the CPU 220 controls the LED 254 under the second control mode. The LED 254 under the first control mode executes an operation which is different from the LED 254 controlled under the second control mode. The operation of the LED 254 controlled under the first and second control modes is described later.

The CPU 220 may control the power supply inside the eyewear device 500. For example, the CPU 220 uses the clock signals from the clock 222 to measure a non-reception period unless synchronization signals are received. If the non-reception period exceeds a predetermined threshold, the eyewear device 500 may enter a sleep mode. For example, the power supply to the light receiver 223, the LED 254 and the optical filter portion 224 is stopped during the sleep mode to extend a life of the battery 255. In this embodiment, the sleep mode refers to an inactive condition of the eyewear device 500 without manual operation of the viewer.

Figure 4:
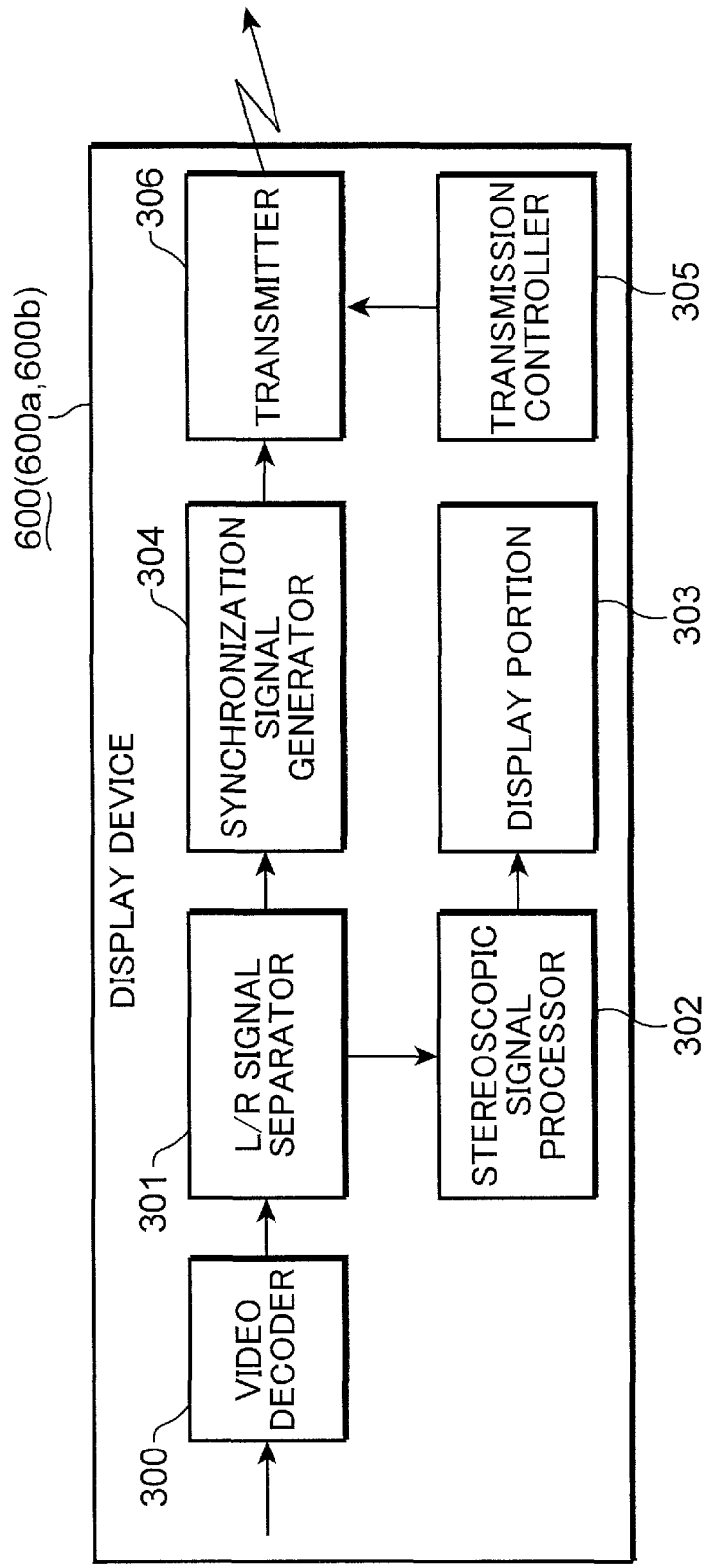
FIG. 4 is a block diagram showing a schematic functional configuration of the display device in correspondence to the block diagram in FIG. 3.

FIG. 4 is a block diagram showing a functional configuration of the display device 600. The functional configuration of the display device 600 is described with reference to FIGS. 3 and 4. The domestic display device 600*a* and the theatre display device 600*b* have a common functional configuration, in order to avoid redundant explanation. However, the domestic display device 600*a* and the theatre display device 600*b* may have different functional configurations from each other because the functional configuration of the display device 600 shown in FIG. 4 is exemplary.

The display device 600 has a video decoder 300, an L/R signal separator 301, a stereoscopic signal processor 302, a display portion 303, a synchronization signal generator 304, a transmission controller 305 and a transmitter 306.

Encoded video signals are input to the video decoder 300. The video decoder 300 decodes the encoded video signals. In the hardware configuration depicted in FIG. 3, the video decoder 300 corresponds to the decoding IC 200.

The L/R signal separator 301 generates or separates a left-eye video signal or a right-eye video signal from the video signals decoded by the video decoder 300.

The stereoscopic signal processor 302 adjusts the L and R video signals separated by the L/R signal separator 301 according to characteristics of the display portion 303, which displays images visually perceived through the eyewear device 500. The stereoscopic signal processor 302 adjusts the parallax between the L and R images according to a display screen size of the display portion 303.

The synchronization signal generator 304 generates synchronization signals in synchronization with or corresponding to the left-eye image or the right-eye image generated by the L/R signal separator 301. Meanwhile, a type of the generated synchronization signal and the generation timing are adjusted according to the characteristics of the display portion 303.

The L/R signal separator 301, the stereoscopic signal processor 302 and the synchronization signal generator 304 correspond to the video signal processing IC 201 in the hardware configuration depicted in FIG. 3.

The display portion 303 displays the video signals, which are processed by the stereoscopic signal processor 302, as images. As described above, the display portion 303 corresponds to the display unit 206 in the hardware configuration shown in FIG. 3.

The transmitter 306 transmits the synchronization signal, which is generated by the synchronization signal generator 304, to the eyewear device 500 under control of the transmission controller 305 (described later). The transmitter 306 corresponds to the light emitter 207 in the hardware configuration shown in FIG. 3.

The transmission controller 305 controls data volumes and transmit intervals of the transmitted synchronization signals.

The transmission controller 305 corresponds to the transmission control IC 202 in the hardware configuration shown in FIG. 3.

Figure 5:
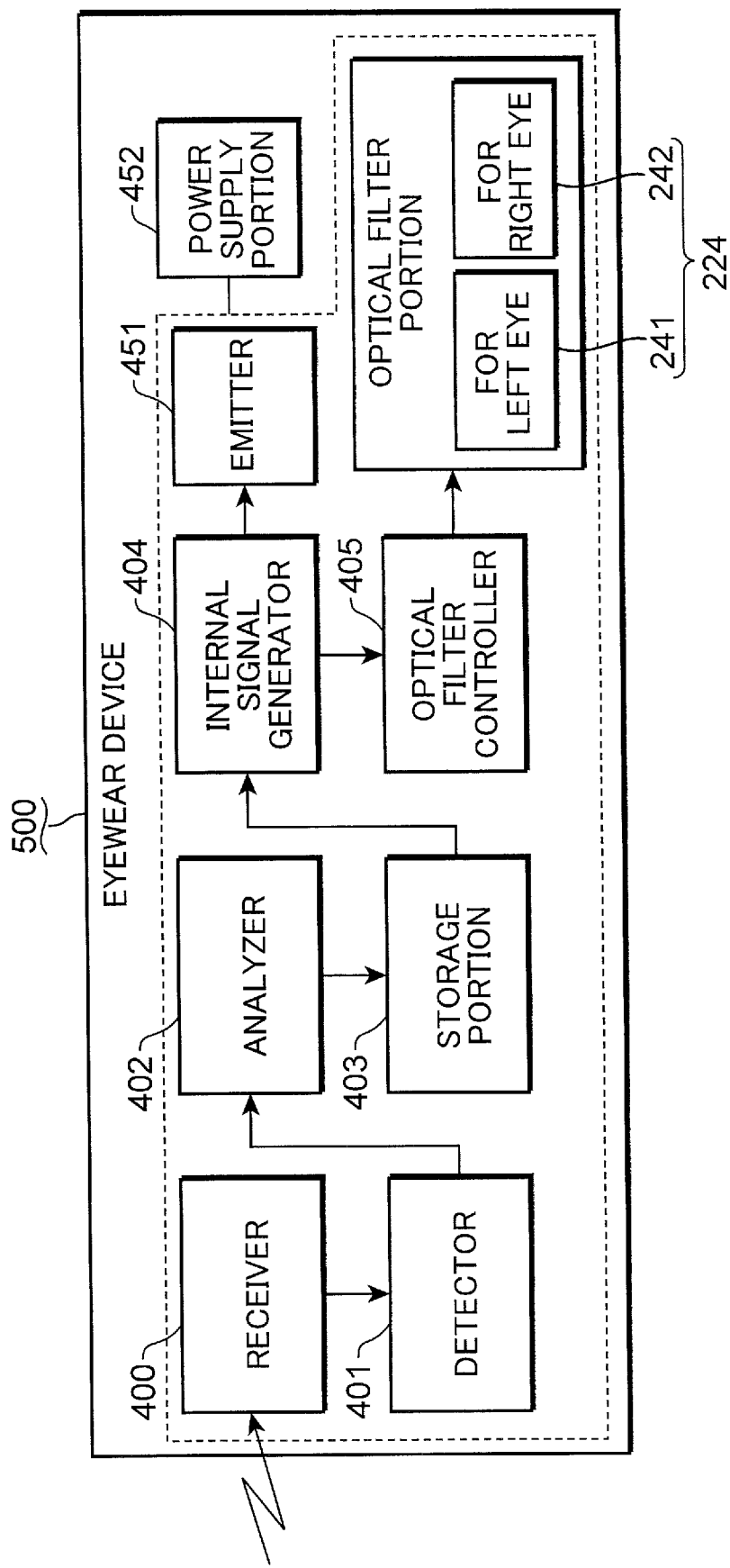
FIG. 5 is a block diagram showing a schematic functional configuration of the eyewear device in correspondence to the block diagram in FIG. 3.

FIG. 5 is a block diagram showing a functional configuration of the eyewear device 500. The functional configuration of the eyewear device 500 is described with reference to FIGS. 3 and 5.

The eyewear device 500 has a receiver 400, a detector 401, an analyzer 402, a storage portion 403, an internal signal generator 404, an optical filter controller 405, an optical filter portion 224, an emitter 451 and a power supply portion 452.

The receiver 400 receives the synchronization signals (infrared signals) transmitted from the display device 600. The receiver 400 outputs an electric signal to the detector 401 in response to the received infrared signal. The receiver 400 corresponds to the light receiver 223 in the hardware configuration shown in FIG. 3.

The detector 401 detects the synchronization signal (electric signal) which the receiver 400 generates from the received infrared signal. The synchronization signal is detected as a signal which has a predetermined electric waveform.

The analyzer 402 analyzes information about an interval time, which is used for operating the optical filter portion 224, on the basis of the synchronization signals detected by the detector 401. For example, the information for operating the optical filter portion 224 (interval time information) means information about the opening and closing timing of the L and R optical filters 241, 242. In this embodiment, the analyzer 402 analyzes the protocol of the synchronization signals (first and second synchronization signals) after the power supply from the battery 255 is started. Based on the analysis result of the protocol, the control of the eyewear device 500 is switched between a first control mode and a second control mode, which is different from the first control mode. The switching operation of the control modes is described later. In this embodiment, the analyzer 402 is exemplified as the selector.

The detector 401 and the analyzer 402 correspond to a part of the programs which the CPU 220 executes in the hardware configuration shown in FIG. 3.

The storage portion 403 records and holds control information about operation content of the optical filter portion 224, which the analyzer 402 analyzes on the basis of the synchronization signals. The storage portion 403 further stores, in advance, data about the protocol of the first and second synchronization signals. The storage portion 403 corresponds to the memory 221 in the hardware configuration shown in FIG. 3. The CPU 220 records the control information in the memory 221. The analyzer 402 and the storage portion 403 are exemplified as the controller.

The internal signal generator 404 generates self-wheeling synchronization signals in the eyewear device 500, on the basis of the synchronization information recorded in the storage portion 403 or analyzed by the analyzer 402. While the receiver 400 does not receive synchronization signals from the display device 600, the optical filter portion 224 may execute the assistance operation on the basis of the self-wheeling synchronization signals, which are generated by the internal signal generator 404.

The internal signal generator 404 generates a lighting signal for controlling turning the emitter 451 ON or OFF according to the control mode (first or second control mode) selected by the analyzer 402. The emitter 451 turns ON/OFF or blinks in response to the lighting signal generated by the internal signal generator 404. The internal signal generator 404 corresponds to the CPU 220 and the clock 222 in the hardware configuration shown in FIG. 3.

The optical filter controller 405 controls the L and R optical filters 241, 242 of the eyewear device 500 (e.g. control for adjusting a transmitted light amount through the optical filter portion 224). The optical filter controller 405 corresponds to programs for controlling the optical filter, which are executed by the CPU 220 in the hardware configuration shown in FIG. 3.

The optical filter portion 224 has the L and R optical filters 241, 242. Various optical elements such as filters for adjusting the transmitted light amount and filters for adjusting the deflection of the transmitted light are exemplified as the L and R optical filters 241, 242. In this embodiment, liquid crystal shutters using liquid crystal elements are used as the L and R optical filters 241, 242. The transmitted light amount to the left or right eye is adjusted by the opening and closing operation of the liquid crystal shutters.

As described above, the images displayed on the display device 600 includes the L and R images. The display device 600 displays the images by alternately switching the L and R images sequentially. The L and R optical filters 241, 242 of the optical filter portion 224 alternately adjust the transmitted light amount. Alternatively, the optical filter portion may change a deflection direction of the image light. Various optical elements configured to adjust the transmitted light amount to the left or right eye in synchronization with the switching operation of the image frame display may be applied to the optical filter portion.

As described above, the emitter 451 turns ON/OFF or blinks in response to the lighting signal, which is generated by the internal signal generator 404. The emitter 451 corresponds to the LED 254 in the hardware configuration shown in FIG. 3.

The power supply portion 452 supplies the power in order to operate the receiver 400, the detector 401, the analyzer 402, the storage portion 403, the internal signal generator 404, the optical filter controller 405, the optical filter portion 224, and the emitter 451. The power supply portion 452 corresponds to the switch 253 and the battery 255 in the hardware configuration shown in FIG. 3.

(Synchronization Signal)

Figure 6:
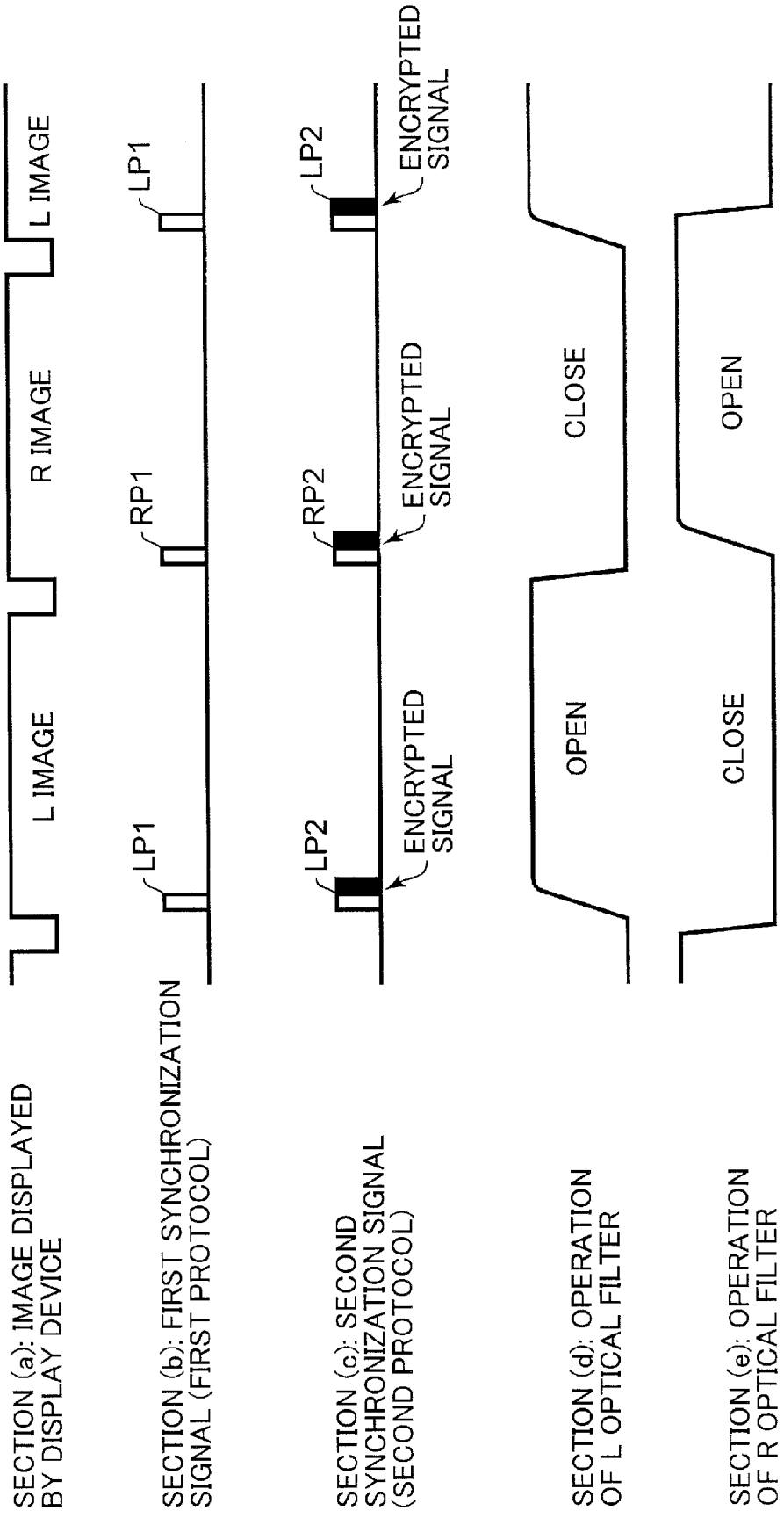
FIG. 6 is a schematic timing chart showing synchronization among image display and synchronization signal transmission of the display device, and an assistance operation of the eyewear device depicted in FIG. 1.

FIG. 6 is a timing chart schematically showing synchronization among the image display by the display device 600, the synchronization signal transmission, and the assistance operation of the optical filter portion 224. The image display by the display device 600, the synchronization signal transmission and the assistance operation of the optical filter portion 224 are described with reference to FIGS. 1 to 6.

The section (a) in FIG. 6 shows images displayed by the display device 600. As shown in the section (a) in FIG. 6, the display device 600 alternately switches and displays the L and R images.

The section (b) in FIG. 6 shows the first synchronization signal, which is transmitted from the domestic display device 600a. The section (c) in FIG. 6 shows the second synchronization signal, which is transmitted from the theatre display device 600b.

The first synchronization signal, which is transmitted from the domestic display device 600a, include a pulse LP1, which is output in synchronization with the display start of the L image, and a pulse RP1, which is output in synchronization with the display start of the R image.

The second synchronization signal, which is transmitted from the theatre display device 600b, includes a pulse LP2, which is output in synchronization with the display start of the L image, and a pulse RP2, which is output in synchronization with the display start of the R image. Unlike pulses LP1 and RP1 of the first synchronization signal, an encrypted signal, in which additional information is encrypted to add additional information to the synchronization information, is added to the pulses LP2 and RP2 of the second synchronization signal. The eyewear device 500 may execute various operations on the basis of the additional information.

In the following description, the signal configuration of the pulses LP1 and RP1 of the first synchronization signal, to which an encrypted signal is not added, is called the "first protocol". The signal configuration of the pulses LP2 and RP2 of the second synchronization signal, to which the encrypted signal is added, is called the "second protocol".

The memory 221 described with reference to FIG. 3 or the storage portion 403 described with reference to FIG. 5 stores information about the first and second protocols in advance. In this embodiment, the information about the first and second protocols is exemplified as the signal configuration data.

The CPU 220 described with reference to FIG. 3 or the analyzer 402 described with reference to FIG. 5 determines whether the encrypted signal is added to pulses of the received synchronization signal. If the encrypted signal is not added to the pulses of the synchronization signal, the CPU 220 or the analyzer 402 selects the first control mode. If the encrypted signal is added to the pulses of the synchronization signal, the CPU 220 or the analyzer 402 selects the second control mode. The first and second control modes are described later.

The section (d) of FIG. 6 schematically shows adjustment of a transmitted light amount to the left eye through the L optical filter 241. The section (e) in FIG. 6 schematically shows adjustment of a transmitted light amount to the right eye via the R optical filter 242.

The memory 221 described with reference to FIG. 3 or the storage portion 403 described with reference to FIG. 5 stores a command program to open the liquid crystal shutter used as the L optical filter 241 and to close the liquid crystal shutter used as the R optical filter 242, in response to the signal configuration of the pulse LP1 of the first synchronization signal or the pulse LP2 of the second synchronization signal. If the pulse LP1 of the first synchronization signal or the pulse LP2 of the second synchronization signal is received, the CPU 220 described with reference to FIG. 3 or the optical filter controller 405 described with reference to FIG. 5 opens the liquid crystal shutter used as the L optical filter 241, and closes the liquid crystal shutter used as the R optical filter 242. Consequently, the transmitted amount of the image light to the left eye increases whereas the transmitted amount of the image light to the right eye decreases, in synchronization with the display start of the L image.

The memory 221 described with reference to FIG. 3 or the storage portion 403 described with reference to FIG. 5 stores a command program to close the liquid crystal shutter used as the L optical filter 241, and to open the liquid crystal shutter used as the R optical filter 242 in response to the signal configuration of the pulse RP1 of the first synchronization signal or the pulse signal RP2 of the second synchronization signal. If the pulse RP1 of the first synchronization signal or the pulse RP2 of the second synchronization signal is received, the CPU 220 described with reference to FIG. 3 or the optical filter controller 405 described with reference to FIG. 5 closes the liquid crystal shutter used as the L optical filter 241 and opens the liquid crystal shutter used as the R optical filter 242. Consequently, the transmitted amount of the image light to the left eye decreases whereas the transmitted amount of the image light to the right eye increases, in synchronization with the display start of the R image.

(Operation of Eyewear Device)

Figure 7:
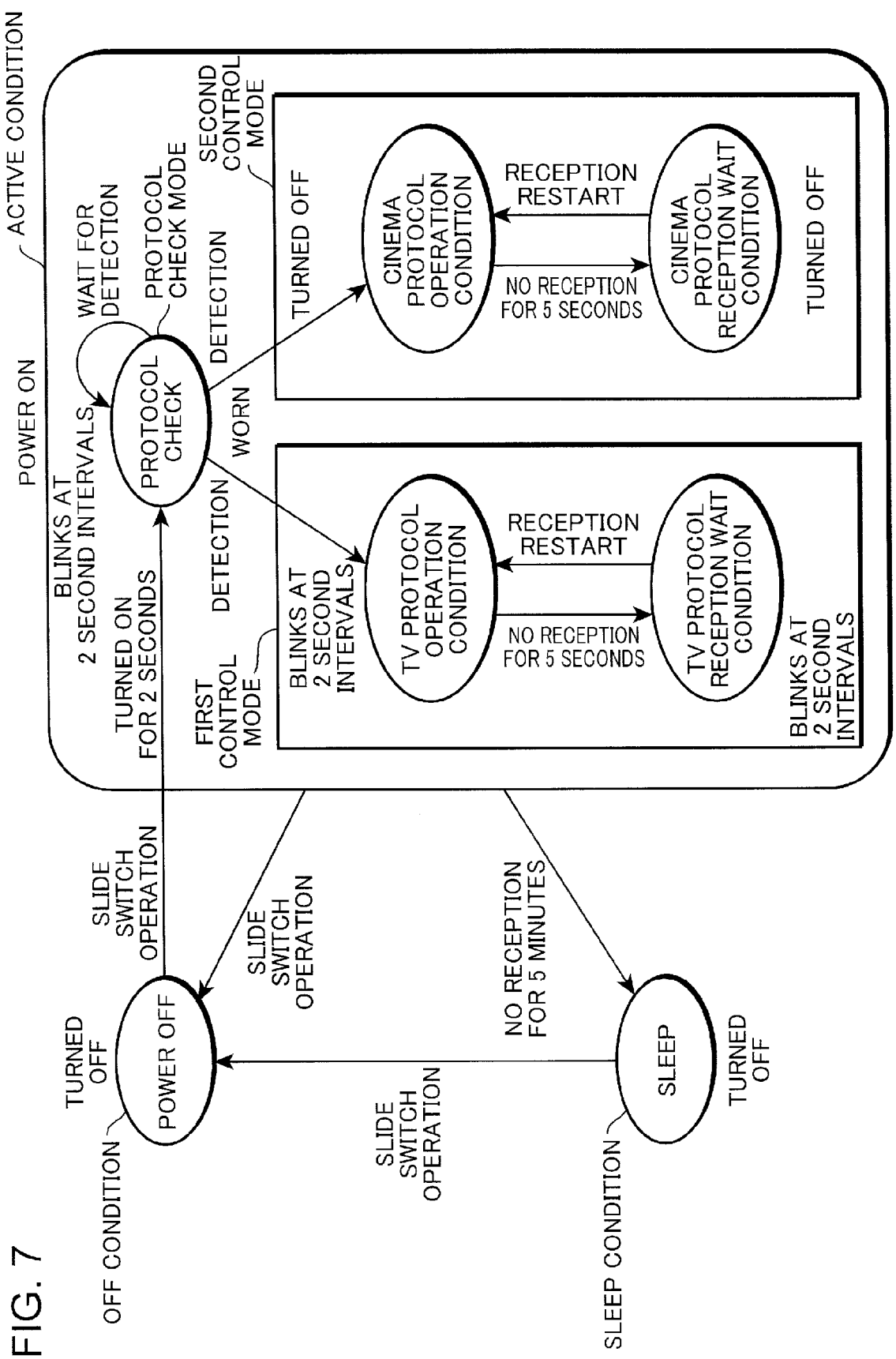
FIG. 7 is a conceptual view schematically showing an operation of the eyewear device depicted in FIG. 2.
Figure 8:
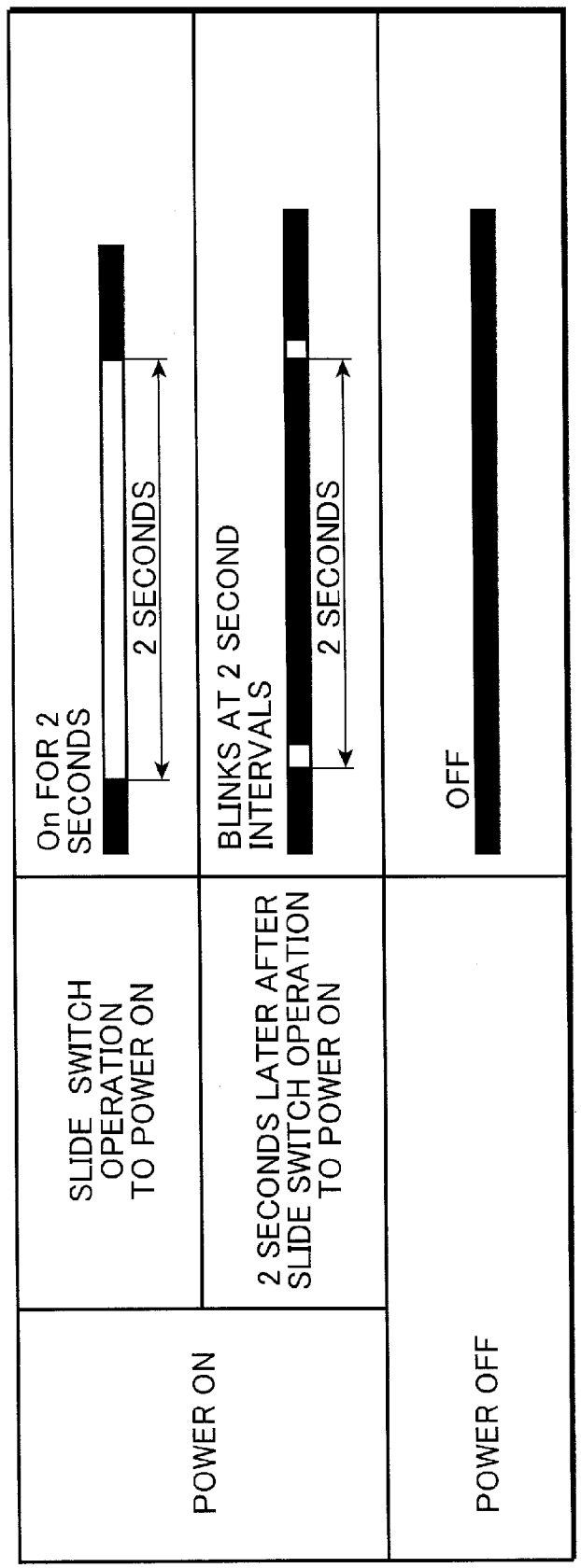
FIG. 8 is a conceptual view schematically showing a lighting operation of an LED of the eyewear device during the operation depicted in FIG. 7.

FIG. 7 is a conceptual view schematically showing operation of the eyewear device 500. FIG. 8 is a conceptual view schematically showing emission of the LED 254 (or the emitter 451) of the eyewear device 500. The operation of the eyewear device 500 is described with reference to FIGS. 2 and 3 and FIGS. 5 to 8.

FIG. 8 shows three operational conditions of the eyewear device 500: OFF condition (OFF mode); active condition (active mode) and sleep condition (sleep mode). The operation of the eyewear device 500 changes among the three operation conditions in response to operation by the viewer and the received synchronization signal.

(OFF Condition to Active Condition)

In the OFF condition, the switch 253 is set to the "OFF" position. This means that the power supply from the battery 255 to elements such as the LED 254, the CPU 220, the optical filter portion 224 and the light receiver 223 is stopped. The LED 254 is therefore turned OFF. In FIG. 8 (bottom row), the LED 254 in the OFF condition is indicated by the black strip.

If the user slides the switch 253 to the "ON" position, for example, the LED 254 turns ON for 2 seconds. In FIG. 8 (top row), the LED 254 in the ON condition is indicated as the white strip. The viewer may confirm that power is supplied to the eyewear device 500 by the LED 254, which continues the ON condition for 2 seconds.

By the aforementioned operation of the switch 253, various elements (e.g. CPU 220, LED 254, optical filter portion 224) of the eyewear device 500 described with reference to FIGS. 3 and 5 enter the operable condition (active condition).

(Active Condition)

The operation of the eyewear device 500 in the active condition includes a protocol check mode, a first control mode and a second control mode.

(Protocol Check Mode)

If the switch 253 is operated and the eyewear device 500 enters the active condition as described above, the operation of the eyewear device 500 enters the protocol check mode. Since the switch 253 is moved to the "ON" position, the light receiver 223 (receiver 400) may receive power supply from the battery 255 as well as the synchronization signal from the display device 600.

In protocol check mode, the eyewear device 500 waits for the detector 401 to detect the synchronization signal. If the detector 401 detects the synchronization signal, the CPU 220 (analyzer 402) analyzes the protocol of the received synchronization signal. As described with reference to FIG. 6, the CPU 220 (analyzer 402) analyzes whether an encrypted signal is added to a pulse included in the received synchronization signal. Unless the encrypted signal is added to the pulse included in the received synchronization signal, the operation of the eyewear device 500 enters the first control mode. If the encrypted signal is added to the pulse included in the received synchronization signal, the operation of the eyewear device 500 enters the second control mode. When the synchronization signal is detected, the CPU 220 (analyzer 402) selects one of the first and second control modes on the basis of the analysis result of the synchronization signal protocol.

For example, the protocol check mode continues for 5 minutes. If a synchronization signal having a coincident protocol to the information about the protocol of the first synchronization signal, which the memory 221 (storage portion 403) stores in advance, is detected within the 5 minutes, the first control mode continues. If a synchronization signal having a coincident protocol to the information about the protocol of the second synchronization signal, which the memory 221 (storage portion 403) stores in advance, is detected within the 5 minutes, the second control mode continues. Unless a coincident synchronization signal to the protocol information, which the memory 221 (storage portion 403) stores in advance, is detected within the 5 minutes, the eyewear device 500 enters the sleep condition. The eyewear device 500 under the sleep condition is described later.

While the CPU 220 (analyzer 402) analyzes the protocol of the received synchronization signal, the CPU 220 (optical filter controller 405) makes the optical filter portion 224 inactive. Therefore, the battery 255 may save the power.

In protocol check mode, the LED 254 blinks at 2 second intervals. In FIG. 8 (mid-row), the black strip means a period when the LED 254 is in the OFF condition whereas the white rectangular area in the black strip means a period (e.g. 0.05 second period) when the LED 254 is in the ON condition. If the LED 254 blinks at 2 second intervals, the viewer may confirm that the eyewear device 500 checks the protocol of the synchronization signal, and then may wear the eyewear device 500.

(First Control Mode)

If the CPU 220 (analyzer 402) selects the first control mode as a result of the protocol check, the CPU 220 (optical filter controller 405) controls the optical filter portion 224 in response to only the first synchronization signal. Therefore, the optical filter portion 224 executes the assistance operation on the basis of the reception timings of the pulses LP1 and RP1 of the first synchronization signal.

The first control mode includes a protocol operation condition to make an operation on the basis of the reception of the first synchronization signal, and a wait condition in which reception of the first synchronization signal is waited. In the protocol operation condition, the eyewear device 500 controls the optical filter portion 224 in response to the received first synchronization signal. Unless the first synchronization signal is received for a relatively short time (e.g. non-receiving condition for 5 seconds), the eyewear device 500 enters the wait condition. During the wait condition, the eyewear device 500 controls the optical filter portion 224 on the basis of the self-wheeling synchronization signals which the internal signal generator 404 generates on the basis of the synchronization information obtained from the previously received first synchronization signals. If the first synchronization signal is detected, for example, within 5 minutes after the non-receiving condition of the first synchronization signal starts, the eyewear device 500 returns to the protocol operation condition. If the non-receiving condition of the first synchronization signal continues for 5 minutes or more, the eyewear device 500 enters the sleep condition. The eyewear device 500 in the sleep condition is described later.

While the eyewear device 500 is controlled in the first control mode, the LED 254 blinks at 2 second intervals. If the viewer takes off the eyewear device 500, the viewer may confirm that the eyewear device 500 is controlled in the first control mode. Since the first synchronization signal is transmitted from the domestic display device 600a, which is used under a relatively bright environment, the blinking of the LED 254 is less likely to interfere with other viewers viewing images.

(Second Control Mode)

If the CPU 220 (analyzer 402) selects the second control mode as a result of the protocol check, the CPU 220 (optical filter controller 405) controls the optical filter portion 224 in response to only the second synchronization signal. Therefore, the optical filter portion 224 executes the assistance operation on the basis of the reception timings of the pulses LP2 and RP2 of the second synchronization signal.

The second control mode includes a protocol operation condition to make an operation in response to the reception of the second synchronization signal, and a wait condition in which reception of the second synchronization signal is waited. In the protocol operation condition, the eyewear device 500 controls the optical filter 224 in response to the received second synchronization signal. Unless the second synchronization signal is received for a relatively short time (e.g. non-receiving condition for 5 seconds), the eyewear device 500 enters the wait condition. During the wait condition, the eyewear device 500 controls the optical filter portion 224 on the basis of the self-wheeling synchronization signals which the internal signal generator 404 generates on the basis of the synchronization information obtained from the previous received second synchronization signals. If the second synchronization signal is detected, for example, within the 5 minutes after the non-receiving condition of the second synchronization signal starts, the eyewear device 500 returns to the protocol operation condition. If the non-receiving condition of the second synchronization signal continues for 5 minutes or more, the eyewear device 500 enters the sleep condition. The eyewear device 500 in the sleep condition is described later.

It is preferable that the memory 221 (storage portion 403) stores the control mode selection result. Even if the control of the optical filter portion 224 using the self-wheeling synchronization signals ends after moving onto the first or second synchronization signal protocol operation condition, the eyewear device 500 may return to the previous protocol operation condition selected by the control mode if the receiver 400 (light receiver 223) receives the same signal as the previously received synchronization signal again. In this embodiment, if the non-receiving period of a synchronization period starts and the synchronization signal is received again within 5 minutes, the eyewear device 500 immediately returns to the previous control mode without the analyzer 402 executing the protocol check mode again. For example, even if the viewer leaves a viewing environment at home or in a theatre for a short period of time (e.g. when the viewer goes to a restroom), the eyewear device 500 may immediately return to the original protocol operation condition when the viewer returns to the viewing environment. The eyewear device 500 automatically returning to the original protocol operation without reentering in the protocol check mode is especially advantageous for the user to view images in a relatively dark environment such as in a movie theatre. Since the eyewear device 500 automatically returns to the original protocol operation, the user does not have to operate the eyewear device 500 in the dark environment. When the user returns to their seat in the theatre, the user may appropriately view the images again if the user simply wears the eyewear device 500.

While the eyewear device 500 is controlled in the second control mode, the LED 254 is turned OFF. Since the second synchronization signal is transmitted from the theatre display device 600b which is viewed by many individuals under a relatively dark environment, all viewers may watch the images displayed by the display device 600b without any interference with light from the LED 254.

(Sleep Condition)

As described above, the eyewear device 500 enters the sleep condition as a result of a relatively long non-receiving condition of a synchronization signal (e.g. non-receiving condition for 5 minutes or more). When the eyewear device 500 is in the sleep condition, the CPU 220 limits the power supply to many elements (e.g. optical filter portion 224, light receiver 223, LED 254) of the eyewear device 500, so as to consume only the minimal power (e.g. power required for switching operation from the sleep condition to the OFF condition).

The power supply to the LED 254 from the battery 255 stops if the eyewear device 500 is in the sleep condition as described above. Therefore, the LED 254 is turned OFF.

The viewer may slide the switch 253 to the "OFF" position to completely shut the power supply from the battery 255 OFF. If the viewer then slides the switch 253 to the "ON" position, the eyewear device 500 enters the active condition.

Figure 9:
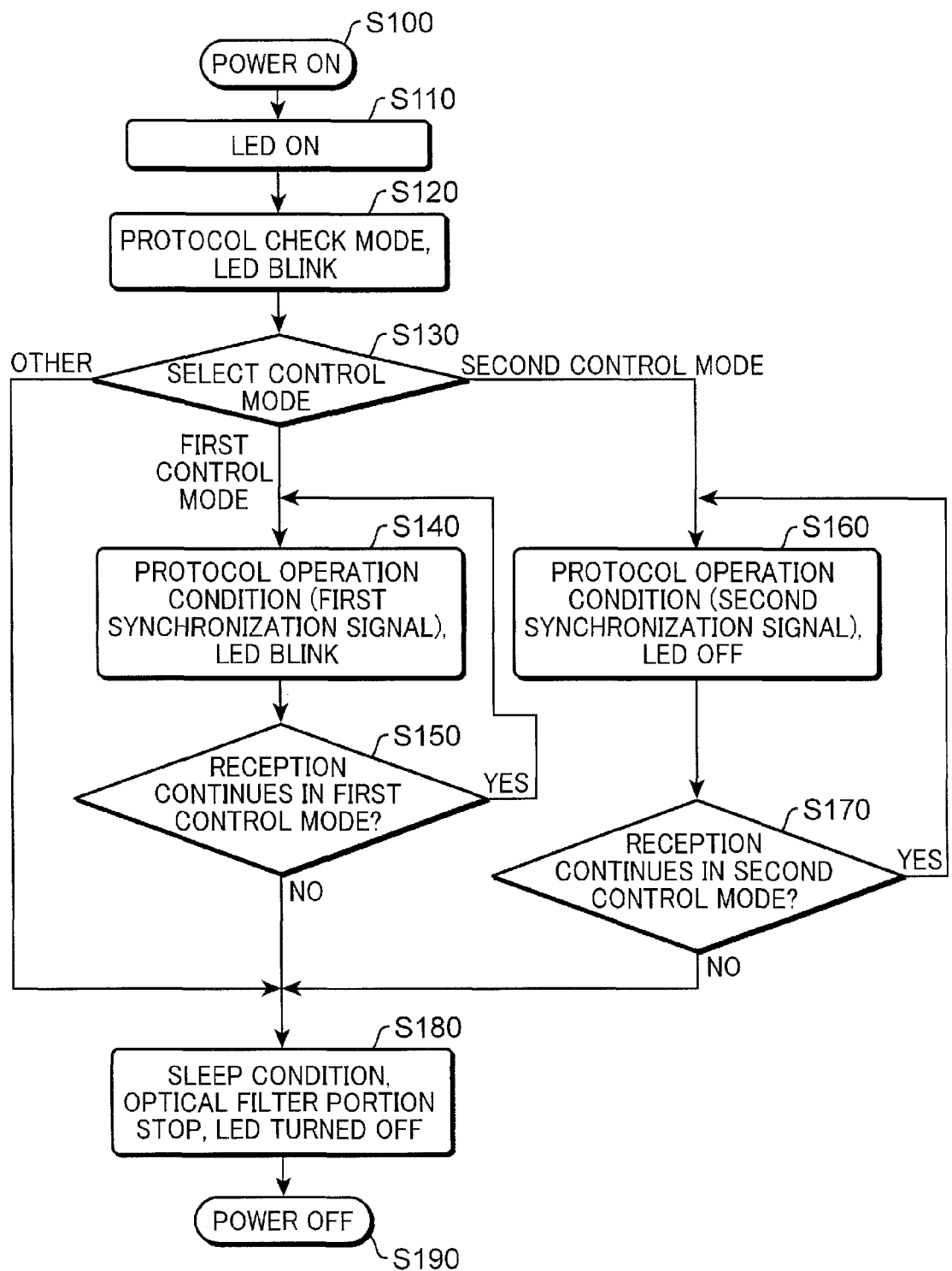
FIG. 9 is a flow chart schematically showing the operation depicted in FIG. 7.

FIG. 9 is a flow chart showing the operation of the eyewear device 500 described with reference to FIG. 7. The operation of the eyewear device 500 is described with reference to FIGS. 2 and 3 and FIGS. 5 to 9.

(Step S100)

In step S100, the viewer slides the switch 253 to the "ON" position. Consequently, the power supply from the battery 255 to elements of the eyewear device 500 (e.g. CPU 220, LED 254, light receiver 223) starts. Then, step S110 is executed.

(Step S110)

Since power is supplied from the battery 255 to the LED 254 and the CPU 220 in step S100, for example, the LED 254 (emitter 451) turns ON for 2 seconds under control of the CPU 220 (internal signal generator 404) in step S110. Then, step S120 is executed.

(Step S120)

In step S120, the eyewear device 500 enters the protocol check mode. When the eyewear device 500 enters the protocol check mode, for example, the LED 254 (emitter 451) blinks at 2 second intervals under control of the CPU 220 (internal signal generator 404).

Since the power supply from the battery 255 to the light receiver 223 starts in step S100, the eyewear device 500 may receive the synchronization signal. The eyewear device 500 waits for receiving the synchronization signal. When the light receiver 223 receives the synchronization signal, step S130 is executed. In this embodiment, the step S120 is exemplified as the step of receiving the synchronization signal.

(Step S130)

In step S130, the eyewear device 500 analyzes the synchronization signal received in step S120 to select a control mode on the basis of the analysis result.

If the synchronization signal received in step S120 has a protocol (e.g. signal configuration to which an encrypted signal is not added), which matches with the information about the protocol of the first synchronization signal that is stored in the memory 221 (storage portion 403) in advance, the CPU 220 (analyzer 402) selects the first control mode. Then, step S140 is executed.

If the synchronization signal received in step S120 has a protocol (e.g. signal configuration to which an encrypted signal is added) which matches with the information about the protocol of the second synchronization signal that is stored in the memory 221 (storage portion 403) in advance, the CPU 220 (analyzer 402) selects the second control mode. Then, step S160 is executed.

Unless the synchronization signal is received, for example, within 5 minutes after the start of the protocol check mode in step S120, step S180 is executed.

In this embodiment, step S130 includes the step of analyzing the synchronization signal, and the step of switching the control mode for the eyewear device 500 between the first control mode and the second control mode, which is different from the first control mode, on the basis of the analysis result of the signal configuration (protocol).

(Step S140)

If the first control mode is selected in step S130, the CPU 220 controls the assistance operation of the optical filter portion 224 in response to the first synchronization signal. The optical filter portion 224 performs the assistance operation to assist in viewing the images by adjusting the transmitted light amount to the left and right eyes of the viewer under control of the CPU 220, so that the viewer may stereoscopically perceive the images displayed by the domestic display device 600a. For example, the LED 254 blinks at 2 second intervals just like step S120.

(Step S150)

Unless the first synchronization signal is received, for example, for 5 seconds or more, step S150 is executed. The CPU 220 uses the clock 222 to measure how long the first synchronization signal is not received. If the first synchronization signal is received, for example, within 5 minutes from the start of step S150, step S140 is executed again. Unless the first synchronization signal is received, for example, for 5 minutes or more from the start of step S150, then step S180 is executed.

(Step S160)

If the second control mode is selected in step S130, the CPU 220 controls the assistance operation of the optical filter portion 224 in response to the second synchronization signal. The optical filter portion 224 performs the assistance operation to assist in viewing the images by adjusting the transmitted light amount to the left and right eyes of the viewer under control of the CPU 220, so that the viewer may stereoscopically perceive the images displayed by the theatre display device 600b. The LED 254 is turned OFF under the control of the CPU 220 (internal signal generator 404).

(Step S170)

Unless the second synchronization signal is received, for example, for 5 seconds or more, step S170 is executed. The CPU 220 uses the clock 222 to measure how long the second synchronization signal is not received. If the second synchronization signal is received, for example, within 5 minutes from the start of step S170, then step S160 is executed again. Unless the second synchronization signal is received, for example, for 5 minutes or more from the start of step S170, then, step S180 is executed.

(Step S180)

If the eyewear device 500 is in the sleep condition in step S180, the CPU 220 limits the power supply to many elements (e.g. optical filter portion 224, light receiver 223 and LED 254) of the eyewear device 500, so as to consume only the minimal power (e.g. power required for switching operation from the sleep condition to the OFF condition).

The power supply from the battery 255 to the LED 254 stops if the eyewear device 500 is in the sleep condition as described above. Therefore, the LED 254 is turned OFF. The stop of the power supply from the battery 255 makes the optical filter portion 224 inactive.

If the LED 254 is switched from blinking to OFF, the viewer viewing the images displayed by the domestic display device 600a may confirm that the eyewear device 500 entered the sleep condition.

(Step S190)

In step S190, the viewer slides the switch 253 to the "OFF" position to completely shut OFF the power supply from the battery 255.

In this embodiment, the operation condition of the eyewear device 500 is notified to the viewer by means of the lighting of the LED 254. A different method from the lighting of the LED 254 may be used to notify the operation condition of the eyewear device to the viewer. For example, the start of the protocol check mode may be notified to the viewer by the opening and closing operation of the optical filter portion (e.g. opening and closing operation at a predetermined cycle and/or for a predetermined number of times, simultaneous opening and closing operation of the liquid crystal shutter, which is used as the L optical filter, and the liquid crystal shutter, which is used as the R optical filter).

In this embodiment, the memory 221 (storage portion 403) may store results of the previously executed protocol check. Then, the protocol of the synchronization signal detected in the previously executed protocol check is preferentially checked, which results in an efficient protocol check.

In this embodiment, the LED 254 (emitter 451) blinks to notify the viewer that the eyewear device 500 is in the protocol check mode. Alternatively, the LED 254 (emitter 451) may continuously keep ON or OFF, or may perform another lighting operation to notify the viewer that the protocol check mode is in operation. Likewise, another operation may be performed than the operation of the LED 254 (emitter 451) described in this embodiment, in order to notify the condition of the first or second control mode, and to notify the power ON condition.

Figure 10:
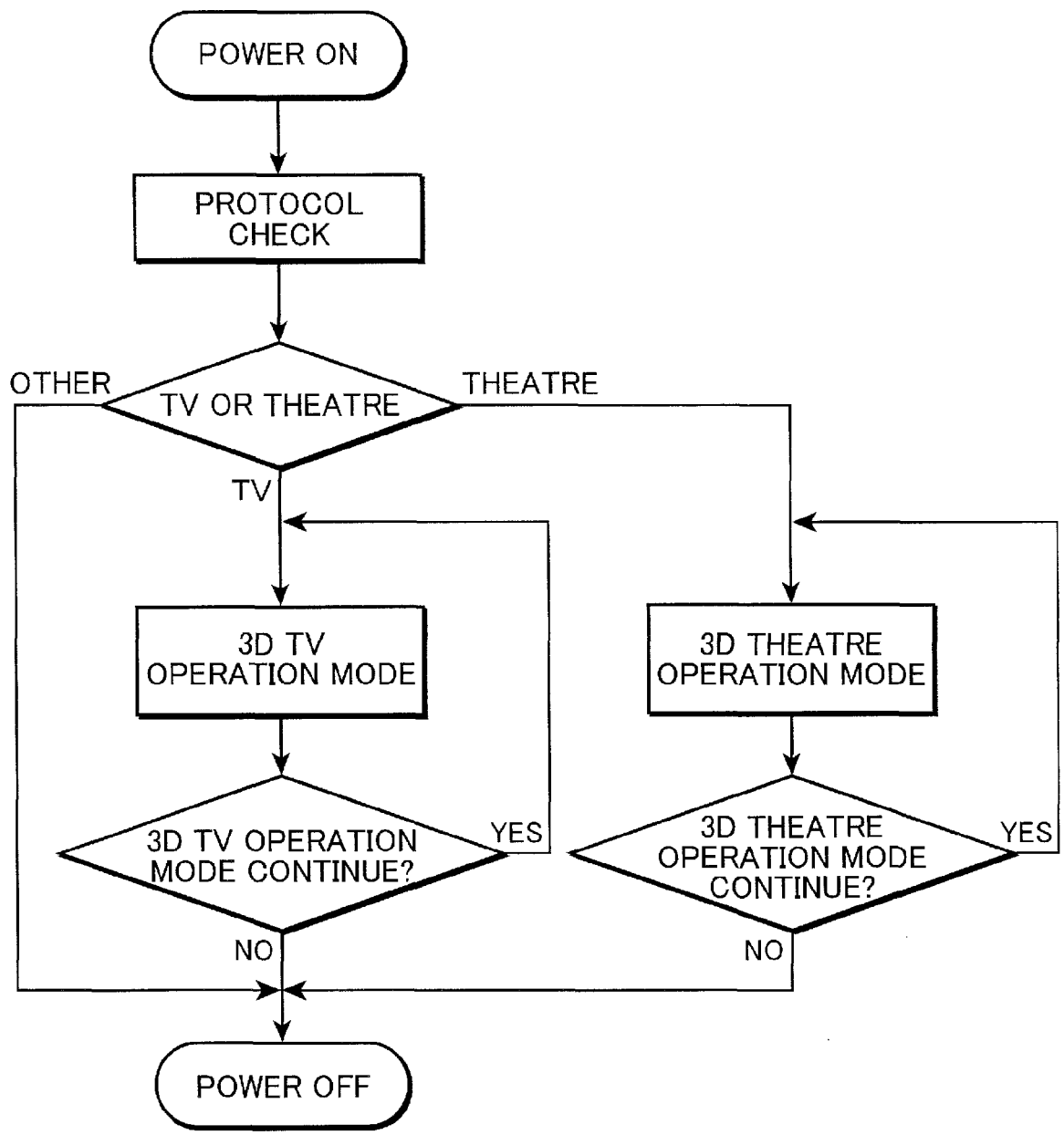
FIG. 10 is a flow chart showing a method for identifying a TV device and a display device used in a theatre according to the flow chart depicted in FIG. 9.

FIG. 10 is a flow chart showing the operation of the eyewear device 500 while a 3D image displayed by a TV device at home is viewed and while a 3D image in a theatre is viewed. The flow chart shown in FIG. 10 conforms to the flow chart described with reference to FIG. 9, but here the operation of the eyewear device 500 in actual use is further clarified. The operation of the eyewear device 500 is described with reference to FIGS. 1, 2 and 10.

If the user sets the switch 253 to "switch ON" (if the eyewear device 500 is turned ON), both the L and R optical filters 241, 242 of the optical filter portion 224 become open. As a result, the user wearing the eyewear device 500 may preferably see the surrounding areas.

As described with reference to FIG. 1, the eyewear device 500 allows the viewer to selectively view a 3D image displayed by a domestic TV device (domestic display device 600a) or 3D image displayed in a theatre (images displayed by the theatre display device 600b (e.g. projector)). The eyewear device 500 performs a protocol check to automatically select the operation mode of the eyewear device 500. The eyewear device 500 may execute the protocol check for the received infrared signal to select an operation mode corresponding to the TV device protocol or the theatre protocol.

FIG. 10 is a flow chart showing how the TV device protocol or the theatre protocol is automatically detected. The user wears the eyewear device 500 and faces the display device 600 (TV device or theatre projection device) which displays a stereoscopic image. Meanwhile, step S220 is executed, so that the eyewear device 500 checks whether an infrared signal conforming to the TV device protocol or the theatre protocol is received. The eyewear device 500 may identify which protocol the eyewear device 500 reacts to on the basis of the infrared signal. Then, the eyewear device may start detecting a synchronization signal which is transmitted by the infrared emitter. If the eyewear device 500 detects one of the protocols, the corresponding operation mode is selected. The selected operation mode continues as long as the same protocol is detected. Unless the eyewear device 500 temporarily receives the protocol (synchronization signal), the eyewear device 500 continues the same operation mode if the eyewear device 500 receives the same protocol (synchronization signal) within a predetermined period (e.g. 5 minutes). In other words, once a protocol is selected, the eyewear device 500 continues in the corresponding operation mode, and does not change the mode to the other operation mode. Unless the eyewear device 500 receives the same protocol within a predetermined period, the eyewear device 500 eventually turns OFF or power is turned OFF (power supply to execute the assistance operation stops).

The aforementioned various embodiments are only exemplary. Therefore, the principle of the aforementioned embodiments is not limited by the detailed description and description of the drawings. Numerous modifications, combinations and omissions can be made by those skilled in the art within the scope of the principle of the embodiments.

The aforementioned embodiments mainly have the following features.

An eyewear device according to one aspect of the above embodiments adjusts a transmitted light amount to a left eye and a right eye of a viewer to perform an assistance operation, which assists the viewer in viewing images so that the viewer stereoscopically perceives the images. The eyewear device includes: a receiver configured to receive a synchronization signal in synchronization with display of the images; and a controller which analyzes a signal configuration of the synchronization signal after power supply is started for the assistance operation, and switches a control mode between a first control mode and a second control mode, which is different from the first control mode, based on an analysis result of the signal configuration.

According to the aforementioned configuration, the eyewear device adjusts the transmitted light amount to the left and right eyes of the viewer to perform the assistance operation, which assists the viewer in viewing images so that the images may be stereoscopically perceived. The receiver receives the synchronization signal in synchronization with the display of the images. The controller analyzes the signal configuration of the synchronization signal after the power supply is started for the assistance operation. The controller switches the control mode between the first control mode and the second control mode, which is different from the first control mode, on the basis of the analysis result of the signal configuration. Since the eyewear device is appropriately controlled in response to the signal configuration of the synchronization signal, the eyewear device may be operated in response to different synchronization signals in configuration.

In the aforementioned configuration, it is preferable that the controller sets the eyewear device to a sleep mode unless the receiver receives the synchronization signal for a predetermined period.

According to the above configuration, without synchronization signals received by the receiver for a predetermined period, the controller sets the eyewear device to the sleep mode, which results in less power consumption.

In the aforementioned configuration, it is preferable that if the controller selects the first control mode as the analysis result of the signal configuration of the synchronization signal before the predetermined period starts, and if the receiver receives the synchronization signal before the eyewear device enters the sleep mode, the controller selects the first control mode without analyzing the signal configuration of the synchronization signal again, and if the controller selects the second control mode as the analysis result of the signal configuration of the synchronization signal before the predetermined period starts, and if the receiver receives the synchronization signal before the eyewear device enters the sleep mode, the controller selects the second control mode without analyzing the signal configuration of the synchronization signal again.

According to the above configuration, if the controller selects the first control mode as the analysis result of the signal configuration of the synchronization signal before the predetermined period starts and if the receiver receives the synchronization signal before the eyewear device enters the sleep mode, the controller selects the first control mode without analyzing the signal configuration of the synchronization signal again. If the controller selects the second control mode as the analysis result of the signal configuration of the synchronization signal before the predetermined period starts and if the receiver receives the synchronization signal before the eyewear device enters the sleep mode, the controller selects the second control mode without analyzing the signal configuration of the synchronization signal again. The controller may smoothly process signals because of no redundant analysis of the signal configuration of the synchronization signal.

It is preferable that the aforementioned eyewear device further includes a notification portion which notifies reception of the synchronization signal, wherein the synchronization signal includes a first synchronization signal and a second synchronization signal, which has a different signal configuration from the first synchronization signal, the controller controls the notification portion under the first control mode if the receiver receives the first synchronization signal, and controls the notification portion under the second control mode if the receiver receives the second synchronization signal, and the notification portion controlled under the first control mode performs a different operation from the notification portion controlled under the second control mode.

According to the aforementioned configuration, the eyewear device further includes a notification portion which notifies reception of the synchronization signal. The synchronization signals include a first synchronization signal and a second synchronization signal, which has a different signal configuration from the first synchronization signal. The controller controls the notification portion under the first control mode if the receiver receives the first synchronization signal. The controller also controls the notification portion under the second control mode if the receiver receives the second synchronization signal. Since the notification portion controlled under the first control mode performs a different operation from the notification portion controlled under the second control mode, the notification portion may notify the reception of the first and/or second synchronization signals to the viewer.

In the aforementioned configuration, it is preferable that the first synchronization signal is transmitted from a TV device or a personal computer which displays a stereoscopic image, and the second synchronization signal is transmitted from a display system which displays a stereoscopic image in a movie theatre.

According to the aforementioned configuration, the first synchronization signal is transmitted from a TV device or a personal computer, which displays a stereoscopic image. The second synchronization signal is transmitted from the display system, which displays a stereoscopic image in a movie theatre. Since the controller switches the control mode between the first control mode and the second control mode, which is different from the first control mode, on the basis of the analysis result of the signal configuration, the user may view both stereoscopic images displayed by a TV device or a personal computer and by a display system in a movie theatre by means of the single eyewear device. Therefore, the user may enjoy viewing the stereoscopic images by means of the single eyewear device, which fits the user best. Since the controller switches the control mode between the first control mode and the second control mode, which is different from the first control mode, on the basis of the analysis result of the signal configuration, the user may view the stereoscopic images under the assistance by the eyewear device, which performs the assistance operation under an appropriate control, without operating the eyewear device in a dark environment of the movie theatre. The switching operation of the control mode may be independent from manual operation by the user. Therefore, it becomes less likely that an inappropriate control mode is set.

In the aforementioned configuration, it is preferable that the notification portion includes an emitter which emits light, and while the controller analyzes the signal configuration of the synchronization signal, the emitter turns ON, turns OFF or blinks to notify the viewer that the controller analyzes the signal configuration.

According to the above configuration, the notification portion includes the emitter which emits light. While the controller analyzes the signal configuration of the synchronization signal, the emitter turns ON, turns OFF or blinks to notify the user that the controller analyzes the signal configuration. Therefore, the viewer may appropriately know an operation condition of the eyewear device.

In the aforementioned configuration, it is preferable that the controller turns the emitter ON if the receiver receives the first synchronization signal, and turns the emitter OFF if the receiver receives the second synchronization signal.

According to the aforementioned configuration, the controller turns the emitter ON if the receiver receives the first synchronization signal. The controller turns the emitter OFF if the receiver receives the second synchronization signal. Therefore, the user may know the reception of the first or second synchronization signal on the basis of whether the emitter turns ON or OFF.

It is preferable that the eyewear device further includes an optical filter portion configured to perform the assistance operation, wherein the controller controls the optical filter portion under the first control mode if the receiver receives the first synchronization signal, and controls the optical filter portion under the second control mode if the receiver receives the second synchronization signal, the optical filter portion controlled under the first control mode performs the assistance operation based on reception timing of the first synchronization signal, and the optical filter portion controlled under the second control mode performs the assistance operation based on reception timing of the second synchronization signal.

According to the aforementioned configuration, the eyewear device further includes the optical filter portion configured to perform the assistance operation. The controller controls the optical filter portion under the first control mode if the receiver receives the first synchronization signal. The controller controls the optical filter portion under the second control mode if the receiver receives the second synchronization signal. The optical filter portion controlled under the first control mode performs the assistance operation on the basis of the reception timing of the first synchronization signal. The optical filter portion controlled under the second control mode performs the assistance operation on the basis of the reception timing of the second synchronization signal. Therefore, the eyewear device may appropriately execute the assistance operation on the basis of the first and second synchronization signals.

In the aforementioned configuration, it is preferable that the controller makes the optical filter portion inactive while the controller analyzes the signal configuration of the synchronization signal.

According to the above configuration, the controller makes the optical filter portion inactive while the controller analyzes the signal configuration of the synchronization signal. Therefore, the power may not be unnecessarily consumed.

In the aforementioned configuration, it is preferable that the controller includes: a storage portion which stores configuration data about the signal configuration of the first and second synchronization signals in advance; and a selector which compares the signal configuration data with the signal configuration of the synchronization signal received by the receiver to select one of the first and second control modes.

According to the aforementioned configuration, the storage portion stores the configuration data about the signal configuration of the first and second synchronization signals in advance. The selector compares the signal configuration data with the signal configuration of the synchronization signal received by the receiver to select one of the first and second control modes. Therefore, the control modes may be appropriately switched.

In the aforementioned configuration, it is preferable that the signal configuration data include data about at least one of: a transmission wavelength band, a transmission radio frequency, a frequency of the synchronization signal, an information volume of the synchronization signal, and a bit stream of the synchronization signal.

According to the aforementioned configuration, the signal configuration data includes data about at least one of: the transmission wavelength band, the transmission radio frequency, the frequency of the synchronization signal, the information volume of the synchronization signal, and the bit stream of the synchronization signal. Therefore, the selector may select one of the first and second control modes on the basis of the characteristics of at least one of: the transmission wavelength band of the synchronization signal received by the receiver, the transmission radio frequency, the frequency of the synchronization signal, the information volume of the synchronization signal, and the bit stream of the synchronization signal.

In the aforementioned configuration, it is preferable that an encrypted signal is added to the second synchronization signal, and the selector compares the signal configuration data with the signal configuration of the synchronization signal received by the receiver, and selects the second control mode if the synchronization signal received by the receiver includes the encrypted signal, and selects the first control mode unless the synchronization signal received by the receiver includes the encrypted signal.

According to the aforementioned configuration, the encrypted signal is added to the second synchronization signal. The selector compares the signal configuration data with the signal configuration of the synchronization signal received by the receiver. The selector selects the second control mode if the synchronization signal received by the receiver includes the encrypted signal. The selector selects the first control mode unless the synchronization signal received by the receiver includes the encrypted signal. Therefore, the controller may appropriately switch the control mode.

A method according to another aspect of the aforementioned embodiments is used for controlling the eyewear device which adjusts transmitted light amount to the left and right eyes of a viewer to perform an assistance operation that assists the viewer in viewing images so that the viewer may stereoscopically perceive the images. The method including: steps of receiving a synchronization signal; analyzing a signal configuration of the synchronization signal; and switching a control mode for the eyewear device between a first control mode and a second control mode, which is different from the first control mode, based on an analysis result of the signal configuration.

According to the aforementioned configuration, the method for controlling the eyewear device which adjusts the transmitted light amount to the left and right eyes of the viewer to perform the assistance operation that assists the viewer in viewing images so that the images may be stereoscopically perceived, includes: the steps of receiving a synchronization signal; analyzing the signal configuration of the synchronization signal; and switching the control mode for the eyewear device between the first control mode and the second control mode, which is different from the first control mode, on the basis of the analysis result of the signal configuration. Therefore, the eyewear device may be operated in response to different synchronization signals in configuration.

INDUSTRIAL APPLICABILITY

The principle of the aforementioned embodiments may be suitable used for an eyewear device which may be commonly used for several types of display devices.

The invention claimed is:

1. An eyewear device which adjusts a transmitted light amount to a left eye and a right eye of a viewer to perform an assistance operation that assists the viewer in viewing images so that the viewer stereoscopically perceives the images, comprising:
   a receiver configured to receive, as a synchronization signal in synchronization with display of the images: a first synchronization signal which is sent from a display device displaying the images, wherein the first synchronization signal does not include an encrypted signal; and a second synchronization signal which is sent from another display device displaying the images, wherein the second synchronization signal includes an encrypted signal; and
   a controller which analyzes a signal configuration of the synchronization signal after power supply is started for the assistance operation, and switches a control mode between a first control mode, and a second control mode, which is different from the first control mode, based on an analysis result of the signal configuration,
   wherein the controller setting the control mode to the first control mode causes the assistance operation in response to the first synchronization signal,
   wherein the controller setting the control mode to the second control mode causes the assistance operation in response to the second synchronization signal,
   wherein, the controller includes:
      a storage portion which stores configuration data about the signal configuration of the first and second synchronization signals in advance; and
      a selector which compares the signal configuration data stored in the storage portion with the signal configuration of the synchronization signal received by the receiver to select one of the first and second control modes,
   wherein the selector selects the second control mode if the signal configuration of the synchronization signal received by the receiver matches with the signal configuration of the second synchronization signal stored in the storage portion, and
   wherein the selector selects the first control mode if the signal configuration of the synchronization signal received by the receiver matches with the signal configuration of the first synchronization signal stored in the storage portion.

2. The eyewear device according to claim 1, wherein the controller sets the eyewear device to a sleep mode unless the receiver receives the synchronization signal for a predetermined period.

3. The eyewear device according to claim 2, wherein
if the controller selects the first control mode as the analysis result of the signal configuration of the synchronization signal before the predetermined period starts, and if the receiver receives the synchronization signal before the eyewear device enters the sleep mode, the controller selects the first control mode without analyzing the signal configuration of the synchronization signal again, and
if the controller selects the second control mode as the analysis result of the signal configuration of the synchronization signal before the predetermined period starts, and if the receiver receives the synchronization signal before the eyewear device enters the sleep mode, the controller selects the second control mode without analyzing the signal configuration of the synchronization signal again.

4. The eyewear device according to claim 1, further comprising a notification portion which notifies reception of the synchronization signal, wherein
the controller controls the notification portion under the first control mode if the receiver receives the first synchronization signal, and controls the notification portion under the second control mode if the receiver receives the second synchronization signal, and
the notification portion controlled under the first control mode performs a different operation from the notification portion controlled under the second control mode.

5. The eyewear device according to claim 4, wherein
the first synchronization signal is transmitted from a TV device or a personal computer which displays a stereoscopic image, and
the second synchronization signal is transmitted from a display system which displays a stereoscopic image in a movie theatre.

6. The eyewear device according to claim 5, wherein
the notification portion includes an emitter which emits light, and
while the controller analyzes the signal configuration of the synchronization signal, the emitter turns ON, turns OFF, or blinks to notify the viewer that the controller is analyzing the signal configuration.

7. The eyewear device according to claim 6, wherein
the controller turns the emitter ON as the first control mode if the receiver receives the first synchronization signal, and turns the emitter OFF as the second control mode if the receiver receives the second synchronization signal.

8. The eyewear device according to claim 4, further comprising:
an optical filter portion configured to perform the assistance operation, wherein
the controller controls the optical filter portion under the first control mode if the receiver receives the first synchronization signal, and controls the optical filter portion under the second control mode if the receiver receives the second synchronization signal,
the optical filter portion controlled under the first control mode performs the assistance operation based on reception timing of the first synchronization signal, and the optical filter portion controlled under the second control mode performs the assistance operation based on reception timing of the second synchronization signal.

9. The eyewear device according to claim 8, wherein the controller makes the optical filter portion inactive while the controller analyzes the signal configuration of the synchronization signal.

10. A method for controlling an eyewear device which adjusts transmitted light amount to a left eye and a right eye of a viewer to perform an assistance operation that assists the viewer in viewing images so that the viewer stereoscopically perceives the images, comprising:
receiving, as a synchronization signal in synchronization with display of the images: a first synchronization signal which is sent from a display device displaying the images, wherein the first synchronization signal does not include an encrypted signal; and a second synchronization which is sent from another display device displaying the images, wherein the second synchronization signal includes an encrypted signal;
analyzing a signal configuration of the synchronization signal;
switching a control mode for the eyewear device between a first control mode and a second control mode, which is different from the first control mode, based on an analysis result of the signal configuration;
executing the assistance operation in response to the first synchronization signal if the control mode is set to the first control mode; and
executing the assistance operation in response to the second synchronization signal if the control mode is set to the second control mode,
wherein, the eyewear device includes a storage portion which stores configuration data about the signal configuration of the first and second synchronization signals in advance, and
wherein the method further comprises:
comparing the stored signal configuration data with the signal configuration of the received synchronization signal,
selecting the second control mode if the signal configuration of the received synchronization signal matches with the stored signal configuration of the second synchronization signal, and
selecting the first control mode if the signal configuration of the received synchronization signal matches with the stored signal configuration of the first synchronization signal.

11. The eyewear device according to claim 1, wherein the signal configuration data include data about at least one of: a transmission wavelength band, a transmission radio frequency, a frequency of the synchronization signal, an information volume of the synchronization signal, and a bit stream of the synchronization signal.

* * * * *